(No Model.)

E. HAZLEHURST.
BUNG CLOSURE.

No. 517,160. Patented Mar. 27, 1894.

Witnesses.
Alfred Bosshardt
Stanley E. Bramall

Inventor.
Edward Hazlehurst,
per Ferdinand Bosshardt
Attorney

UNITED STATES PATENT OFFICE.

EDWARD HAZLEHURST, OF OLDHAM, ENGLAND.

BUNG-CLOSURE.

SPECIFICATION forming part of Letters Patent No. 517,160, dated March 27, 1894.

Application filed August 1, 1893. Serial No. 482,076. (No model.) Patented in England September 23, 1892, No. 17,019.

*To all whom it may concern:*

Be it known that I, EDWARD HAZLEHURST, a subject of the Queen of Great Britain, residing at Oldham, in the county of Lancaster, England, have invented new and useful improvements in and connected with means for closing, sealing, and protecting the tap-holes of barrels, casks, or other vessels, (for which I have obtained a patent in Great Britain, No. 17,019, dated September 23, 1892,) of which the following is a specification.

My invention is designed to dispense with corks in the corking or stoppering of barrels, casks, and other vessels and at the same time provide for the more adequate sealing and protecting of the same.

Figure 1:
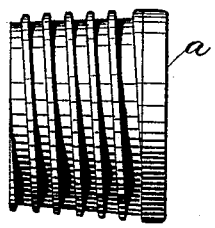
Figure 2:
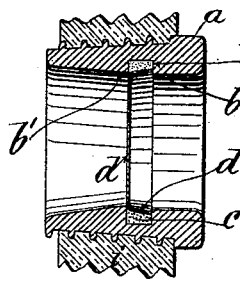
Figures 3, 4:
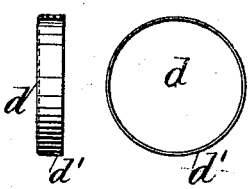
Figure 5:
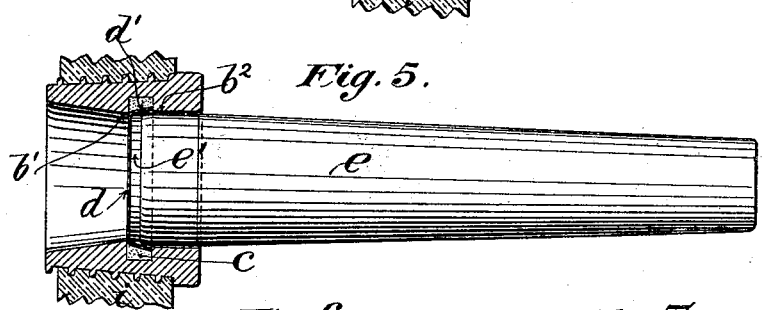
Figure 6:
Figure 7:
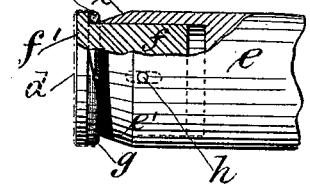
Figure 8:
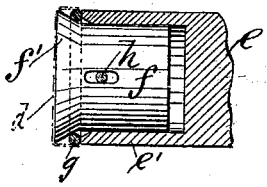

In the accompanying drawings, Figure 1 is a side view and Fig. 2 a longitudinal section of the said bush. Fig. 3 is a side view and Fig. 4 an end view of the seal used in connection therewith. Fig. 5 is a longitudinal section of bush and seal with tool in position after the expansion of the seal has taken place. Fig. 6 shows an elevation of the front end of the said tool with seal in dotted lines in position thereon, ready for being driven into the bush. Fig. 7 is a similar view as Fig. 6; Fig. 8 a sectional end view and Fig. 9 an end view of Fig. 8 of some modifications of the said tool. Fig. 10 shows the tap in position in the tap hole and the seal driven into the barrel.

Similar letters refer to similar parts throughout the several views.

In carrying out my invention and referring to the figures generally, the plug or bush $a$ is constructed with an external screw thread by which it is secured to the end of the barrel or it may be otherwise affixed in the end of the barrel. Near the mouth or outer edge of the bush $a$ is formed an internal groove $b$ with the edge or shoulder $b'$ at its inner side higher or of less diameter than the edge or shoulder $b^2$ at its outer side. The groove $b$ is fitted with a ring or packing $c$ of rubber or other material. A flanged disk $d, d'$, is inserted into the mouth of the bush $a$ and driven in until the back rests against the inner and higher shoulder $b'$ and the flange $d'$ is then expanded or forced outward until it compresses the packing ring $c$ and its outer edge is driven past the outer shoulder or edge $b'$ of the groove $b$ it is thus securely held in position and a liquid tight joint is formed. The interior of the hollow bush $a$ is slightly tapered to expand inward from the higher or inner shoulder $b'$ of the groove $b$ to present no obstruction to the passage of the disk inward after being dislodged from the groove in the operation of tapping the barrel. The flanged disk $d, d'$, is preferably stamped from sheet metal and when inserted in position completely closes the orifice of the bush and seals it. The flanged disk $d, d'$, is placed into the bush $a$ and its flange $d'$ expanded therein by a special tool $e$, for instance such as shown in Figs. 5 and 6, the front end $e'$ of which is reduced and serves to receive the disk $d, d'$, and afterward expand its flange $d'$ by driving the end $e'$ to the bottom of the disk $d, d'$, as shown in Fig. 5. A more preferable form of tool for the said purpose however is that shown in Fig. 7, consisting of a hollow front end and a plug $f$ arranged to slide therein longitudinally, having a shoulder $f'$ equal in diameter to the inner diameter of the disk $d, d'$, and carrying a split ring $g$ between the shoulder $f'$ and hollow end $e'$ of the tool $e$. The latter is tapered off to the edge externally so as to allow of being driven between the split ring $g$ and plug $f'$ and thus expand the ring $g$ against the interior of the flange $d'$ of the disk $d, d'$, and thereby expand the same against the packing ring $c$ in the bush $a$.

Figure 9:
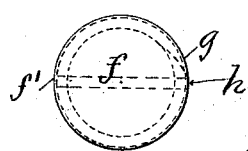
Figure 10:
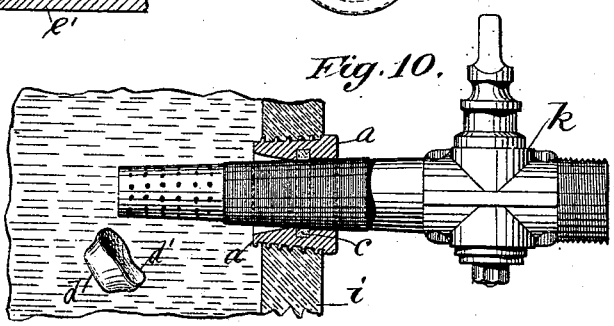

A modification of the tool described consists in forming the end $e'$, see Figs. 8 and 9, straight instead of taper and the plug $f$ with a taper shoulder $f'$ instead of a straight one, the tendency of the straight end of the tool $e$ being to slide the split ring $g$ on the taper shoulder $f'$ and thus expand it against the flange $d'$ of the disk $d, d'$. In each case the plug $f$ is secured in position in the tool $e$ by a screw or pin $h$. The barrel $i$ is tapped in the ordinary way by wrapping some suitable kind of fibrous material around the tap $k$ and by driving the end thereof against the disk $d, d'$, with sufficient force to dislodge and drive it past the shoulder $b'$ of the groove $b$ against which it rests, into the interior of the barrel or cask $i$, see Fig. 10. It is of course obvious that this method of corking or stopping may be applied to other vessels than barrels.

What I claim as my invention, and desire to secure by Letters Patent, is—

A stopper consisting of a hollow bushing $a$ having an internal groove $b$ with the rear edge $b'$ higher than the front edge $b^2$, the packing in said groove and the disk bearing against the high edge $b'$ and having a flange $d'$ extending over the packing with its edge bent down behind the opposite edge $b^2$, substantially as described.

EDWARD HAZLEHURST.

Witnesses:
ALFRED BOSSHARDT,
STANLEY E. BRAMALL.